United States Patent
Chen et al.

(10) Patent No.: US 10,438,562 B2
(45) Date of Patent: Oct. 8, 2019

(54) METHOD AND SYSTEM FOR ADJUSTING SCREEN BRIGHTNESS OF TERMINAL, AND TERMINAL COMPRISING THE SYSTEM

(71) Applicant: JRD COMMUNICATION INC., Shenzhen, Guangdong (CN)

(72) Inventors: Jianqiang Chen, HuiZhou (CN); Feifei Chai, HuiZhou (CN)

(73) Assignee: JRD COMMUNICATIONS INC., Shenzhen, Guangdong (CN)

( * ) Notice: Subject to any disclaimer, the term of this patent is extended or adjusted under 35 U.S.C. 154(b) by 132 days.

(21) Appl. No.: 15/563,303

(22) PCT Filed: Oct. 25, 2016

(86) PCT No.: PCT/CN2016/103158
§ 371 (c)(1),
(2) Date: Sep. 29, 2017

(87) PCT Pub. No.: WO2017/133274
PCT Pub. Date: Aug. 10, 2017

(65) Prior Publication Data
US 2018/0122335 A1    May 3, 2018

(30) Foreign Application Priority Data
Feb. 1, 2016  (CN) .......................... 2016 1 0068274

(51) Int. Cl.
*G09G 5/10* (2006.01)
*H04M 19/04* (2006.01)
(Continued)

(52) U.S. Cl.
CPC .......... *G09G 5/10* (2013.01); *H04M 1/72522* (2013.01); *H04M 1/72569* (2013.01);
(Continued)

(58) Field of Classification Search
CPC ..... G09G 2320/0626; G09G 2360/144; G09G 5/10
See application file for complete search history.

(56) References Cited

U.S. PATENT DOCUMENTS 10,198,099 B2 *  2/2019  Sakai .................... G06F 3/0488
2008/0303938 A1 * 12/2008  Huang ................... G03B 15/05
348/371

(Continued)

FOREIGN PATENT DOCUMENTS

| CN | 104468912 A | 3/2015 |
| CN | 104660766 A | 5/2015 |
| CN | 105577941 A | 5/2016 |

*Primary Examiner* — Chun-Nan Lin

(57) ABSTRACT

A method, a system, and a terminal for adjusting screen brightness of the terminal includes the steps of obtaining a first screen display brightness value corresponding to ambient light brightness value, and obtaining illumination value of a camera and looking up a second screen display brightness value. When the second screen display brightness value is greater than the first screen display brightness value, the second screen display brightness value is set as the screen display brightness value. Namely, the display brightness is controlled by an Automatic Exposure Control (AEC) system, which increases displaying detail of image on the display.

17 Claims, 4 Drawing Sheets

(51) Int. Cl.
  *H04M 1/725*     (2006.01)
  *H04N 5/235*     (2006.01)
  *H04N 7/14*      (2006.01)

(52) U.S. Cl.
  CPC .......... *H04M 19/04* (2013.01); *H04N 5/2351* (2013.01); *H04N 5/2353* (2013.01); *H04N 5/2354* (2013.01); *H04N 7/142* (2013.01); *G09G 2320/0626* (2013.01); *G09G 2360/144* (2013.01); *H04M 2250/52* (2013.01)

(56) References Cited

U.S. PATENT DOCUMENTS

2009/0181719 A1\* 7/2009 Cho .................. H04M 1/72522
  455/556.1
2009/0278828 A1\* 11/2009 Fletcher ................ G06F 1/3203
  345/207
2012/0182275 A1\* 7/2012 Chen ........................ G09G 5/10
  345/207
2016/0163029 A1\* 6/2016 Gibbon .............. G06K 9/00221
  382/190

\* cited by examiner

METHOD AND SYSTEM FOR ADJUSTING SCREEN BRIGHTNESS OF TERMINAL, AND TERMINAL COMPRISING THE SYSTEM

BACKGROUND

1. Field of the Invention

The present disclosure relates to field of smart terminals, and more particularly, to a method, a system, and a terminal for adjusting screen brightness of terminal.

2. Description of the Prior Art

Cameras are regarded as the main selling point in current mobile phone market competition, and camera quality is more important aspect in user experience for mobile phones.

Current mobile phones adjust brightness of screens using an optical sensor to monitor brightness of ambient light to adapt to screen brightness. When the brightness of the ambient light is darker, display brightness of the screen is darker. On the contrary, when the brightness of the ambient light is brighter, the display brightness of the screen is brighter.

However, the above design inconveniences camera function of the mobile phones. Therefore, there is a need to improve and develop the conventional technique.

SUMMARY OF THE DISCLOSURE

Based on deficiency of the prior art, the aim of the present disclosure is to provide a method, a system, and a terminal for adjusting screen brightness of the terminal capable of solving an issue that user cannot clearly see detail of image when brightness of ambient light is dark.

The technical scheme of the present disclosure is as follows.

A method for adjusting screen brightness of a terminal comprising:
- A: obtaining ambient light brightness value when the terminal is on, and setting a first screen display brightness value corresponding to the ambient light brightness value as screen display brightness value;
- B: monitoring a working state of a camera of the terminal, obtaining illumination value of the camera when the terminal starts the camera, and looking up a second screen display brightness value according to the illumination value of the camera;
- C: comparing the first screen display brightness value with the second screen display brightness value, setting the second screen display brightness value as the screen display brightness value when the second screen display brightness value is greater than the first screen display brightness value; and
- D: monitoring the working state of the camera of the terminal, and setting the first screen display brightness value as the screen display brightness value.

In the method for adjusting the screen brightness of the terminal, before the step A, the method further comprises:
- A0: presetting a database storing corresponding relationship between the ambient light brightness value and the first screen display brightness value, and corresponding relationship between the illumination value and the second screen display brightness value.

In the method for adjusting the screen brightness of the terminal, the step A particularly comprises:

- A1: determining whether the terminal is on or not, and monitoring, by an optical sensor, the brightness value B of the ambient light at location of the terminal when the terminal is on;
- A2: looking up the display brightness value L1 of the first screen according to the brightness value B of the ambient light; and
- A3: adjusting the display brightness of the screen according to the first screen display brightness value.

In the method for adjusting the screen brightness of the terminal, the step A2 particularly comprises:
- providing brightness interval of the ambient light according to the brightness value B of the ambient light; and
- obtaining the first screen display brightness value according to the screen display brightness value corresponding to the brightness interval of the ambient light;
- where the brightness interval of the ambient light is in one-to-one correspondence with display brightness interval of the screen.

In the method for adjusting the screen brightness of the terminal, the step B particularly comprises:
- B1: monitoring the working state of the camera of the terminal, obtaining, by Automatic Exposure Control (AEC) system, the illumination value E of the camera when the camera starts; and
- B2: looking up the second screen display brightness value according to the illumination value of the camera.

In the method for adjusting the screen brightness of the terminal, the step B1 particularly comprises:
- calculating, by the AEC system, the illumination value E in real-time according to brightness of target ambiance.

In the method for adjusting the screen brightness of the terminal, before the step B2, the method further comprises:
- presetting corresponding relationship between the illumination value and the second screen display brightness value, and storing the corresponding relationship in a database.

A system for adjusting screen brightness of a terminal, comprises:
- a monitoring ambient light module obtaining ambient light brightness value and setting a first screen display brightness value corresponding to the ambient light brightness value as display brightness value of a screen when the terminal is on;
- a camera exposure module monitoring a working state of a camera of the terminal, obtaining illumination value of the camera when the terminal starts the camera, and looking up a second screen display brightness value according to the illumination value of the camera; and
- an adjusting screen brightness module comparing the first screen display brightness value with the second screen display brightness value, and setting the second screen display brightness value as the screen display brightness value when the second screen display brightness value is greater than the first screen display brightness value.

The system for adjusting the screen brightness of the terminal, further comprises:
- a monitoring state module monitoring the working state of the camera of the terminal and setting the first screen display brightness value as the screen display brightness value when the camera is off by the terminal.

The system for adjusting the screen brightness of the terminal, further comprises:
- a presetting module presetting a database, corresponding relationship between the ambient light brightness value and the first screen display brightness value, and corresponding relationship between the illumination value and the second screen display brightness value are stored in the database.

In the system for adjusting the screen brightness of the terminal, the monitoring ambient light module comprises:
  a first obtaining unit determining whether the terminal is on or not, monitoring the brightness value B of the ambient light by the optical sensor at a location of the terminal when the terminal is on;
  a first look-up unit looking up the display brightness value L1 of the first screen according to the brightness value B of the ambient light; and
  an adjusting unit adjusting the display brightness of the screen according to the display brightness value L1 of the first screen.

In the system for adjusting the screen brightness of the terminal, the first look-up unit is configured to that:
  brightness interval of the ambient light is provided according to the brightness value B of the ambient light; and
  the first screen display brightness value is obtained according to the screen display brightness value corresponding to the brightness interval of the ambient light;
  where the brightness interval of the ambient light is in one-to-one correspondence with display brightness interval of the screen.

In the system for adjusting the screen brightness of the terminal, the camera exposure module comprises:
  a second obtaining unit monitoring the working state of the camera of the terminal and obtaining illumination value via an Automatic Exposure Control (AEC) system of the camera when the camera starts; and
  a second look-up unit looking up the display brightness value L2 of the second screen according to the illumination value.

In the system for adjusting the screen brightness of the terminal, the AEC system calculates the illumination value E in real-time according to brightness of target ambiance.

In the system for adjusting the screen brightness of the terminal, the camera exposure module further comprises a database storing corresponding relationship between the illumination value and the second screen display brightness value.

A terminal comprises a system for adjusting screen brightness of the terminal, the system comprises:
  a monitoring ambient light module obtaining ambient light brightness value and setting a first screen display brightness value corresponding to the ambient light brightness value as display brightness value of a screen when the terminal is on;
  a camera exposure module monitoring a working state of a camera of the terminal, obtaining illumination value of the camera when the terminal starts the camera, and looking up a second screen display brightness value according to the illumination value of the camera; and
  an adjusting screen brightness module comparing the first screen display brightness value with the second screen display brightness value, and setting the second screen display brightness value as the screen display brightness value when the second screen display brightness value is greater than the first screen display brightness value.

In the terminal, the system for adjusting the screen brightness of the terminal further comprises:
  a monitoring state module monitoring the working state of the camera of the terminal and setting the first screen display brightness value as the screen display brightness value when the camera is off by the terminal.

In the terminal, the system for adjusting the screen brightness of the terminal further comprises: a presetting module presetting a database, corresponding relationship between the ambient light brightness value and the first screen display brightness value, and corresponding relationship between the illumination value and the second screen display brightness value are stored in the database.

In the terminal, the monitoring ambient light module comprises:
  a first obtaining unit determining whether the terminal is on or not, monitoring the brightness value B of the ambient light by the optical sensor at a location of the terminal when the terminal is on;
  a first look-up unit looking up the display brightness value L1 of the first screen according to the brightness value B of the ambient light; and
  an adjusting unit adjusting the display brightness of the screen according to the display brightness value L1 of the first screen.

In the terminal, the camera exposure module comprises:
  a second obtaining unit monitoring the working state of the camera of the terminal and obtaining illumination value via an Automatic Exposure Control (AEC) system of the camera when the camera of the terminal starts; and
  a second look-up unit looking up the display brightness value L2 of the second screen according to the illumination value.

The present disclosure provides the method, the system, and the terminal for adjusting the screen brightness of the terminal: obtaining the ambient light brightness value when the terminal is on, and setting the first screen display brightness value corresponding to the ambient light brightness value as display brightness value of a screen; monitoring the working state of the camera of the terminal, obtaining the illumination value of the camera when the terminal starts the camera, and looking up the second screen display brightness value according to the illumination value of the camera; and comparing the first screen display brightness value with the second screen display brightness value, setting the second screen display brightness value as the screen display brightness value when the second screen display brightness value is greater than the first screen display brightness value. In the present disclosure, target ambiance or object of the camera is dark, the optical sensor cannot display bright on the dark ambient, and the present disclosure uses the AEC system to control brightness of the display, further increasing image displaying detail on the display, which is convenient to the users.

DETAILED DESCRIPTION

Figure 1:
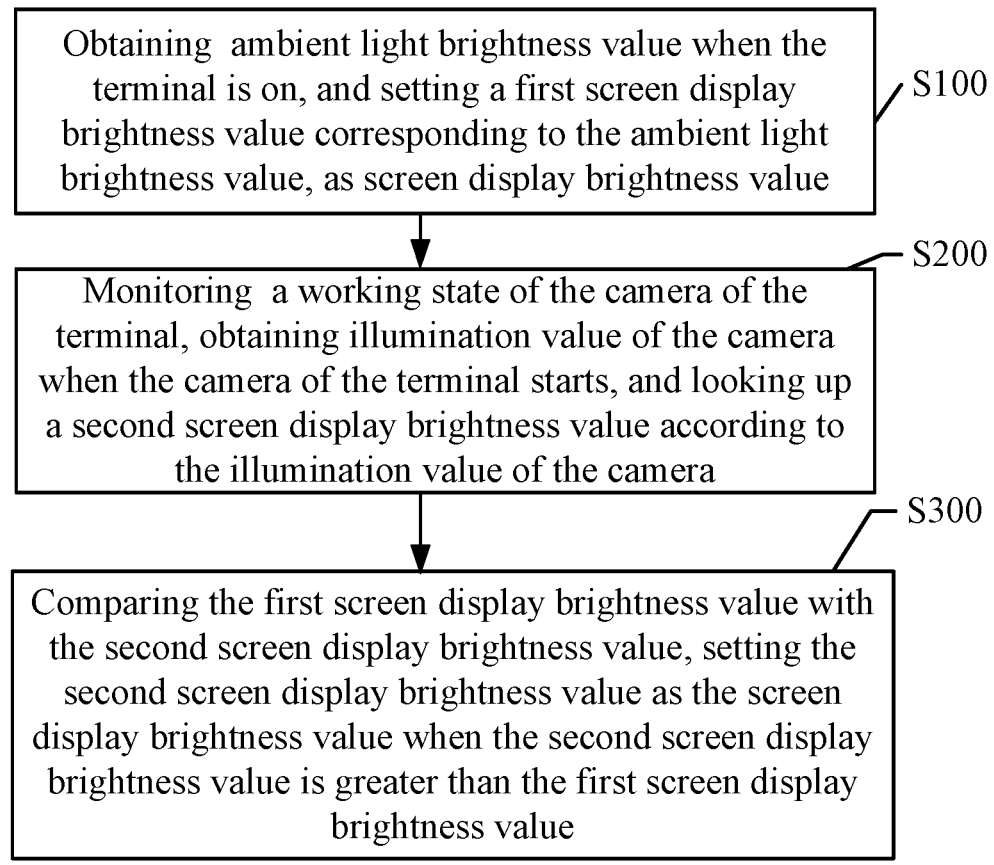
FIG. 1 is a flowchart of a method for adjusting brightness of a screen of a terminal of a preferred embodiment of the present disclosure.

The present disclosure provides a method, a system, and a terminal for adjusting a screen brightness of the terminal. In order to more clearly and definitely illustrate aim, the technical scheme and effects of the present disclosure, the present disclosure will further be described in detail according to the drawing. It should be understood that the present disclosure has been described with reference to certain preferred and alternative embodiments which are intended to be exemplary only and do not limit the full scope of the present disclosure.

For explaining terminology of embodiment of the present disclosure, where "terminal" represents the terminal having camera, for example: ipod, mobile phones.

The present disclosure will further be described in detail in accordance with the figures and the exemplary examples.

As shown in FIG. 1, FIG. 1 is a flowchart of a method for adjusting screen brightness of a terminal of a preferred embodiment of the present disclosure, the method comprises:

S100: obtaining, by an optical sensor, ambient light brightness value when the terminal is on, and setting a first screen display brightness value corresponding to the ambient light brightness value, as screen display brightness value.

To be specific, the terminal is on, which means that the terminal is from a sleep state to a wake-up state, namely, when the screen of the terminal lights, the terminal obtains the ambient light brightness value B from ambiance via the optical sensor of the terminal. The first screen display brightness value is looked up according to the ambient light brightness value B, and the first screen display brightness is set as the screen display brightness.

Furthermore, corresponding relationship between the ambient light brightness value and the first screen display brightness value is preset and stored in a database. The corresponding relationship between the ambient light brightness value and the first screen display brightness value is that the first screen display brightness value increases as the ambient light brightness value increases, and the first screen display brightness value decreases as the ambient light brightness value decreases. Thus, the screen display brightness is adjusted according to the ambient light brightness. On one hand, the user can clearly obtain display content of the screen, and on the other hand, energy consumption can be reduced.

Furthermore, the ambient light brightness value B is in one-to-one correspondence with the first screen display brightness value L1. Namely, one brightness value B of the ambient light corresponds to one display brightness value L1 of the first screen. The corresponding relationship between the ambient light brightness value B and the first screen display brightness value L1 prestored in the terminal can be a functional relationship. When the ambient light brightness value B is monitored, the first screen display brightness value L1 is correspondingly calculated according to the functional relationship. In the embodiment, the corresponding relationship between the ambient light brightness value B and the first screen display brightness value L1 is an increasing linear function. In other embodiment, the corresponding relationship between the ambient light brightness value B and the first screen display brightness value L1 is a monotonically increasing function.

Furthermore, the screen display brightness of the mobile terminal usually preset, such as the screen display brightness is divided into five stages, thus, the ambient light brightness value is divided into five intervals, and the ambient light brightness interval is in one-to-one correspondence with the screen display brightness interval. The corresponding relationship between the ambient light brightness interval and the screen display brightness interval is stored in list form. When the ambient light brightness value B is monitored, correspondingly, the first screen display brightness value L1 is obtained according to the screen display brightness value corresponding to the ambient light brightness interval.

Furthermore, the first screen display brightness value corresponding to the ambient light brightness value B is set as the screen display brightness value. Namely, the screen display brightness value is adjusted by the terminal according to the first screen display brightness value, and the screen display brightness value is set as the first screen display brightness value.

Step 200: monitoring a working state of the camera of the terminal, obtaining illumination value of the camera when the camera of the terminal starts, and looking up a second screen display brightness value according to the illumination value of the camera.

To be specific, monitoring the working state of the camera of the terminal is that an on/off state of the camera of the terminal is monitored. When the camera is on, the user will use the camera to take a picture. Noticeably, the working state of the camera of the terminal is monitored based on starting the screen of the terminal. Namely, the terminal obtains the ambient light brightness of ambiance via the optical sensor and adjusts the screen display brightness.

Furthermore, the terminal is monitored to start the camera, and an Automatic Exposure Control (AEC) system calculates the illumination value E in real-time according to brightness of target ambiance. Thereby, the screen display brightness is obtained according to the illumination value. Illumination value E required to take the picture is obtained by the AEC system of the terminal, and the second screen display brightness value L2 is looked up according to the illumination value E, where the corresponding relationship between the second screen display brightness value L2 and the illumination value E is preset and stored in the database.

Furthermore, the illumination value E is in a one-to-one correspondence with the second screen display brightness value L2. Namely, one illumination value E corresponds to one second screen display brightness value L2. Thereby, the corresponding relationship between the second screen display brightness value L2 and the illumination value E prestored in the terminal can be a functional relationship. When the AEC system monitors the illumination value, the first screen display brightness value L1 is correspondingly calculated according to the functional relationship. In the embodiment, the corresponding relationship between the second screen display brightness value L2 and the illumination value E is an increasing linear function. In other embodiment, the corresponding relationship between the second screen display brightness value L2 and the illumination value E is also a monotonically increasing function.

Furthermore, the screen display brightness of the mobile terminal usually preset, such as the screen display brightness is divided into five stages, thus, the illumination value E is divided into five intervals, and the illumination value interval is in one-to-one correspondence with the screen display brightness interval. The corresponding relationship between the illumination value interval and the screen display brightness interval is stored in list form. When the illumination value E is monitored, correspondingly, the second screen display brightness value L1 is obtained according to the screen display brightness value corresponding to the illumination value interval.

Step 300: comparing the first screen display brightness value with the second screen display brightness value, setting the second screen display brightness value as the screen display brightness value when the second screen display brightness value is greater than the first screen display brightness value.

To be specific, when the second screen display brightness value is looked up. The second screen display brightness value is compared with the first screen display brightness value: if the second screen display brightness value is greater than the first screen display brightness value, the user can not clearly see details of a screen image based on current screen display brightness. Thus, the screen display brightness value is adjusted as the second screen display brightness value, and the screen display brightness is adjusted according to the second screen display brightness value.

If the second screen display brightness value is less than the first screen display brightness value, the user can clearly see details of the screen image based on the current screen display brightness, thus, there is no need to adjust the current screen display brightness.

Furthermore, when the camera is off, the terminal sets the first screen display brightness value as the screen display brightness value and adjusts the screen display brightness according to the first screen display brightness value. In practical application, when the camera is off, the optical sensor of the terminal monitors the ambient light brightness value of the ambiance, the first screen display brightness value is correspondingly looked up according to the ambient light brightness value, the first screen display brightness value is updated and the screen display brightness is adjusted according to the current first screen display brightness value.

Figure 2:
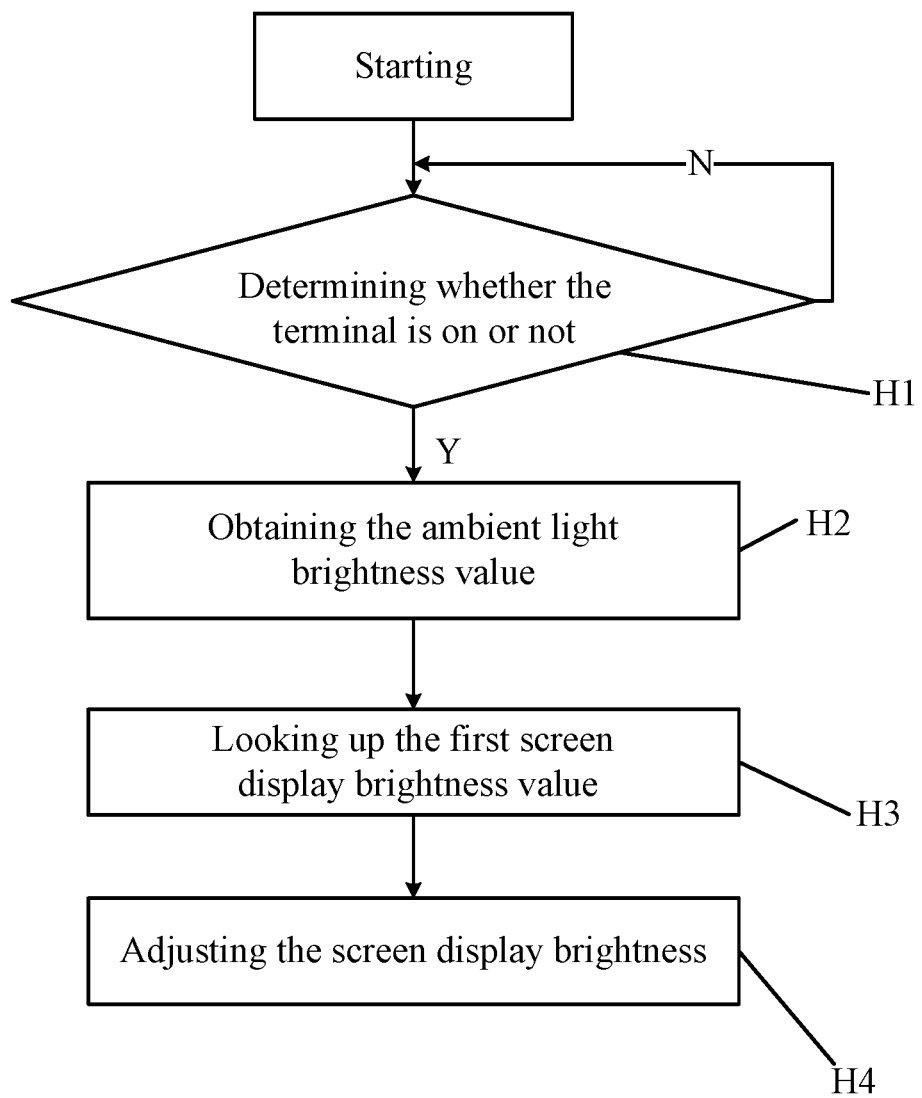
FIG. 2 is a flowchart of the method for adjusting the brightness of the screen according to ambient light of the present disclosure.

In order to understand technical scheme of the present disclosure, the present disclosure provides a method for adjusting the screen display brightness based on the optical sensor as shown in FIG. 2, the method comprises:

H1: determining whether the terminal is on or not;
H2: monitoring and obtaining, by the optical sensor, the ambient light brightness value B of the ambiance when the terminal is on;
H3: looking up the first screen display brightness value L1 according to the ambient light brightness value B monitored by the optical sensor;
H4: adjusting the screen display brightness according to the first screen display brightness value L1.

To be specific, the corresponding relationship between the ambient light brightness value B monitored by the optical sensor and the first screen display brightness value L1 is prestored, where the ambient light brightness value B is in one-to-one correspondence with the first screen display brightness value L1 and the corresponding relationship can be established through look-up table. Noticeably, the ambient light brightness value B monitored by the optical sensor is greater, and the first screen display brightness value L1 is greater.

Figure 3:
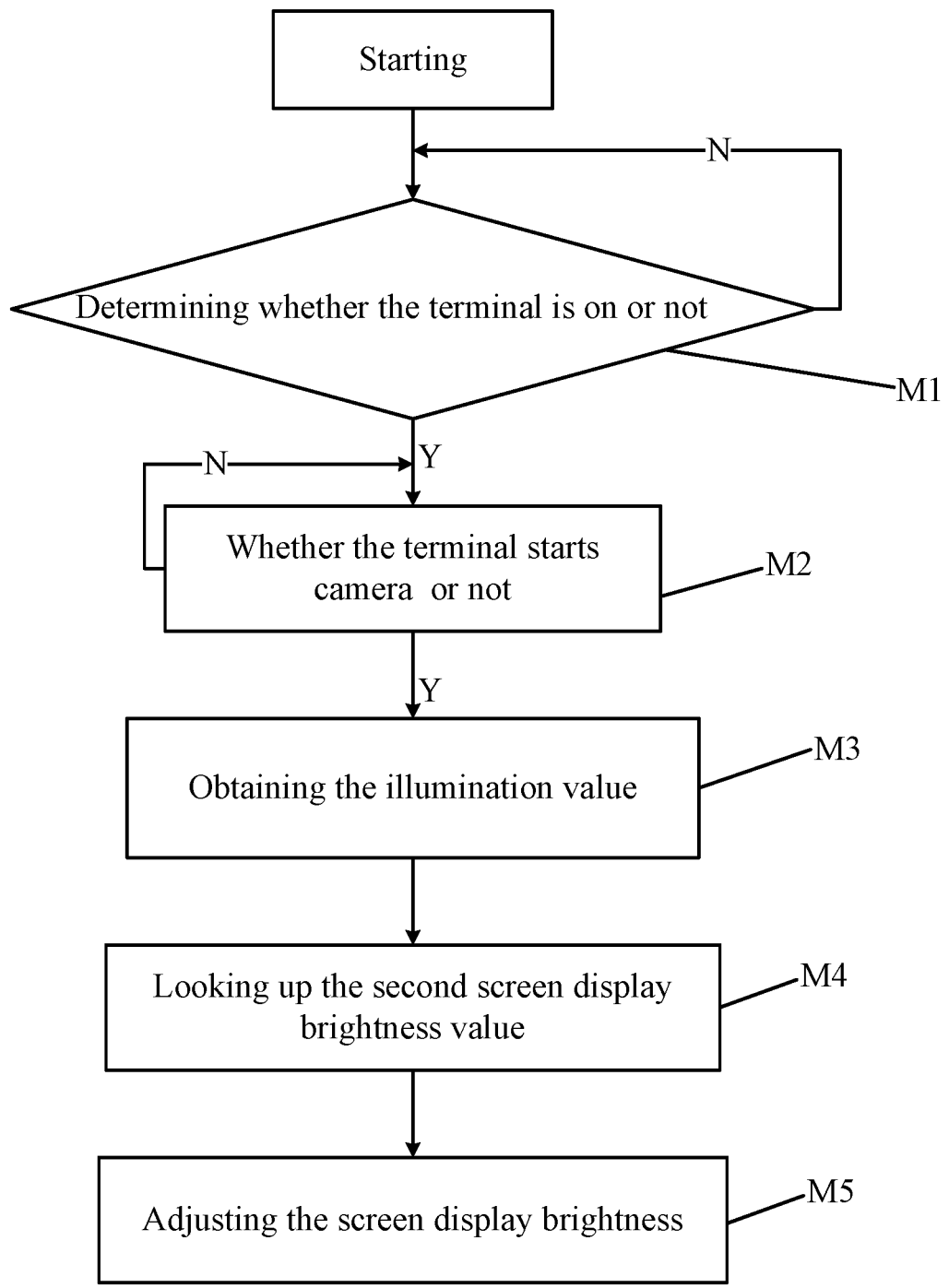
FIG. 3 is a flowchart of the method for adjusting the brightness of the screen according to illumination value of the present disclosure.

In order to understand technical scheme of the present disclosure, the present disclosure provides a method for adjusting the screen display brightness of the terminal based on the illumination value, as shown in FIG. 3, the method comprises:

M1: determining whether the terminal is on or not;
M2: monitoring whether the terminal starts the camera application or not when the terminal is on;
M3: obtaining, by the camera, the ambient light brightness, and calculating, by the AEC system of the terminal, illumination value E required to take the picture when the camera application is started;
M4: looking up the second screen display brightness value according to the illumination value E;
M5: adjusting the screen display brightness according to the second screen display brightness value.

To be specific, the AEC system of the camera calculates the illumination value E in real-time according to the brightness of the target ambiance, and different of the illumination value corresponds to different display brightness of the screen. Thereby, the illumination value E is in one-to-one correspondence with the second screen display brightness value L2. The corresponding relationship between the second screen display brightness value L2 and the illumination value E is prestored in the terminal. When the illumination value is obtained, the second screen display brightness value L2 corresponding to the illumination value is looked up according to the prestored corresponding relationship, further adjusting the screen brightness. Noticeably, when the illumination value calculated by the AEC system of the camera is greater, the brightness of the target ambiance of the camera is darker. In order to clearly see the details of the screen image of the terminal, the second screen display brightness value L2 needs to be greater, thereby, the corresponding relationship between the illumination value and the second screen display brightness value L2 is that the second screen display brightness value L2 increases as the illumination value increases.

Figure 4:
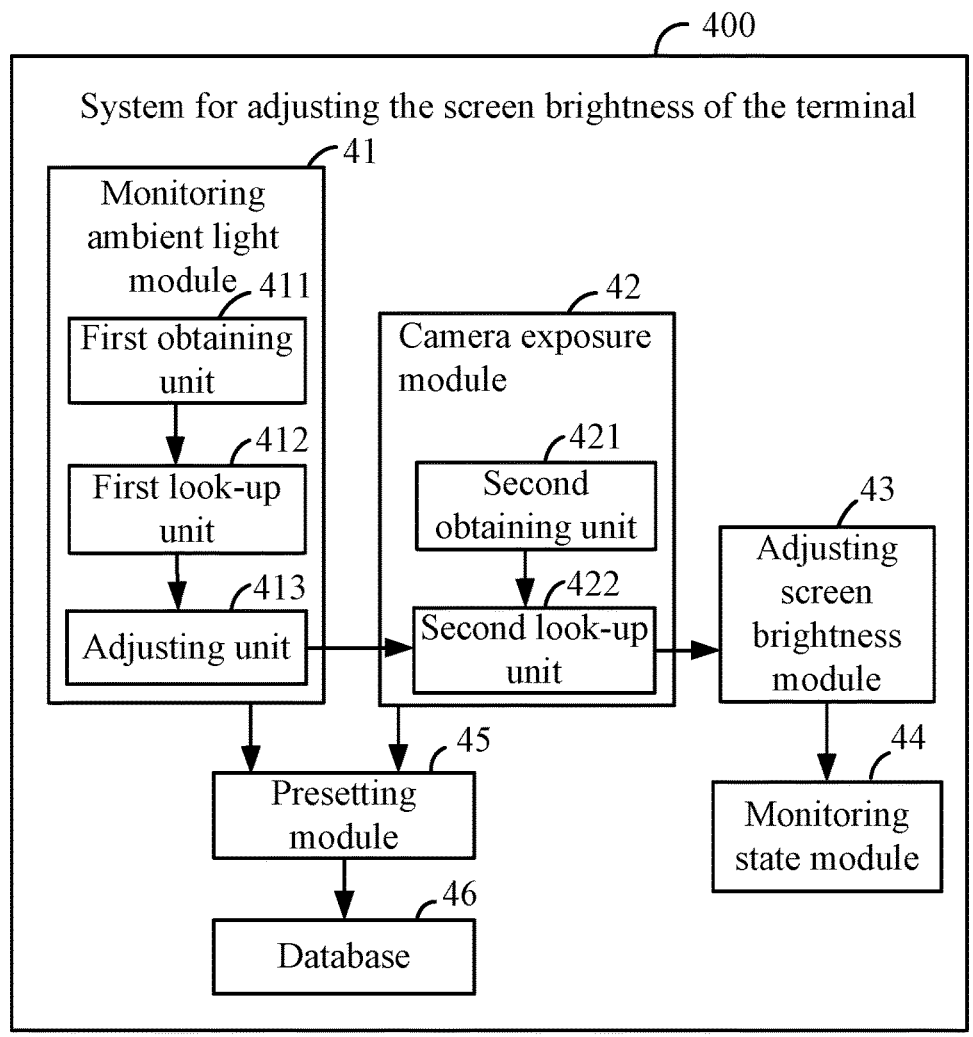
FIG. 4 is a structural schematic diagram of a system for adjusting the brightness of the screen of the present disclosure.

The present disclosure further provides a system 400 for adjusting the screen brightness of the terminal, as shown in FIG. 4, the system comprises:

a monitoring ambient light module 41 obtaining the ambient light brightness value and setting the first screen display brightness value corresponding to the ambient light brightness value as the screen display brightness value when the terminal is on;
a camera exposure module 42 monitoring the working state of the camera of the terminal, obtaining illumination value of the camera when the camera of the terminal starts, and looking up the second screen display brightness value according to the illumination value;
an adjusting screen brightness module 43 comparing the first screen display brightness value with the second screen display brightness value, and setting the second screen display brightness value as the screen display brightness value when the second screen display brightness value is greater than the first screen display brightness value.

In addition, the system 400 for adjusting the screen brightness of the terminal further comprises:

a monitoring state module 44 monitoring the working state and setting the first screen display brightness value as the screen display brightness value when the camera is off by the terminal;
a presetting module 45 presetting the database 46, corresponding relationship between the ambient light brightness value and the first screen display brightness value, and corresponding relationship between the illumination value and the second screen display brightness value are stored in the database 46.

To be specific, the monitoring ambient light module 41 comprises a first obtaining unit 411 determining whether the terminal is on or not and monitoring the ambient light brightness value B by the optical sensor at a location of the terminal when the terminal is on;

a first look-up unit 412 looking up the first screen display brightness value L1 according to the ambient light brightness value B; and an adjusting unit 413 adjusting the screen display brightness according to the first screen display brightness value L1.

To be specific, the camera exposure module 42 comprises a second obtaining unit 421 monitoring the working state of the camera of the terminal and obtaining illumination value via the AEC system of the camera when the camera of the terminal starts;

a second look-up unit 422 looking up the second screen display brightness value L2 according to the illumination value.

A person skilled in the art should understand that method and system of the above embodiment can use software plus a necessary universal hardware platform to achieve. It should be understood that method and system of the above embodiment can use the hardware to achieve, however in many cases the former is a preferred embodiment. Based on the above understanding, the technical scheme of the present disclosure can be embodied by form of software product in essence or in part that contributes to the prior art. The software product of the computer is stored in a storage medium (such as read only memory (ROM)/random-access memory (RAM), diskette, optical disk), where the storage medium comprises a plurality of commands making an intelligent terminal (such as mobile phones, computers, servers, air-conditioners or network devices) execute the method of each of the embodiment of the present disclosure.

Figure 5:
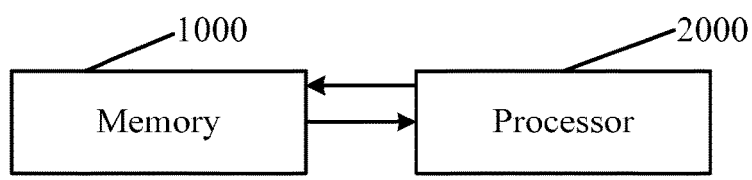
FIG. 5 is a schematic diagram of a terminal of the present disclosure.

Thereby, the present disclosure provides a terminal as shown in FIG. 5, the terminal comprises:

a processor 2000; and a memory 1000 storing commands executed by the processor 2000.

The processor 2000 is configured to that:

When the terminal is on, the ambient light brightness value is obtained, and the first screen display brightness value corresponding to the ambient light brightness value is set as the screen display brightness value;

When the terminal starts the camera, the working state of the camera of the terminal is monitored, the illumination value of the camera is obtained, and the second screen display brightness value is looked up according to the illumination value of the camera.

The first screen display brightness value is compared with the second screen display brightness value, and the second screen display brightness value is set as the screen display brightness value when the second screen display brightness value is greater than the first screen display brightness value.

Processing component usually controls overall operation of the intelligent terminal, such as operations associated with display, telephone call, data communication, camera operation, and camera operation, and recording operations. The processing component can comprise one or more processes executing the commands to achieve all steps or part steps of the above method. In addition, the processing component can comprise one or more modules, which is convenient to handle interactions between components and other components. For example, the processing component can comprise a multimedia module, where the multimedia module is convenient to handle interactions between multimedia components and the processing components.

The memory is configured to store various types of data to support operation of the device. The data comprise commands, contact data, phone book data, messages, pictures, and video for any application or method of the operation on an intelligent terminal. The memory may be implemented by any type of volatile or nonvolatile memory device, or a combination thereof, such as static random access memory (SRAM), electrically erasable programmable read only memory (EEPROM), erasable programmable read only memory (EPROM), a programmable read-only memory (PROM), a read only memory (ROM), a magnetic memory, a flash memory, a magnetic disk or an optical disk.

Intelligent terminal can be smart wear equipment, such as smart watch.

In an exemplary embodiment, the intelligent terminal may be implemented by one or more Application Specific Integrated Circuit (ASIC), Digital Signal Processor (DSP), Digital Signal Processor Device (DSPD), Programmable Logic Device (PLD), Field Programmable Gate Array (FPGA), a controller, a microcontroller, a microprocessor, or other electronic component to execute the above method.

In an exemplary embodiment, a non-transitory computer readable storage medium comprising commands is provided, such as a memory comprising commands, the above commands are executed by the processor of the intelligent terminal to complete the above method. For example, the non-transitory computer readable storage medium can be ROM, RAM, CD-ROM, a magnetic tape, a floppy disk, and an optical data storage device.

The commands of the non-transitory computer readable storage medium is executed by the processor of the intelligent terminal, which makes the intelligent terminal execute the above method for adjusting the screen brightness of the terminal, the method comprise:

obtaining the ambient light brightness value when the terminal is on, and the first screen display brightness value corresponding to the ambient light brightness value is set as the screen display brightness value;

monitoring working state of the camera of the terminal, obtaining illumination value of the camera when the camera of the terminal starts, and looking up second screen display brightness value according to the illumination value of the camera; and comparing the first screen display brightness value with the second screen display brightness value, the second screen display brightness value is set as the screen display brightness value when the second screen display brightness value is greater than the first screen display brightness value.

A person skilled in the art should understand that after the specification and practice of the present disclosure are disclosed, other embodiments will be readily apparent to the person skilled in the art. The present disclosure is intended to cover any variations, uses, or adaptations of the present disclosure, which follow the general principles and encompass any of the common general knowledge or prior art techniques disclosure in the art that are not disclosure in this disclosure. The specification and examples are to be considered in all respects as illustrative only and the true scope and spirit of the disclosure is set forth in the following claims.

It should be understood that present disclosure is not limited to the exemplary examples. Person skilled in the art should understand and achieve that equivalent replacement and improvement is according to the above description. The equivalent replacements and improvements should be considered to belong to the protection scope of the present disclosure.

What is claimed is:

1. A method for adjusting screen brightness of a terminal, comprising:
   obtaining ambient light brightness value, and setting a first screen display brightness value corresponding to the ambient light brightness value as a screen display brightness value;
   monitoring a working state of a camera of the terminal, obtaining illumination value of the camera, and looking up a second screen display brightness value according to the illumination value of the camera;
   comparing the first screen display brightness value with the second screen display brightness value, setting the second screen display brightness value as the screen display brightness value when the second screen display brightness value is greater than the first screen display brightness value; and
   setting the first screen display brightness value as the screen display brightness value when the camera is off by the terminal;
   wherein during the step for monitoring the working state of the camera of the terminal, obtaining the illumination value of the camera, and looking up the second screen display brightness value according to the illumination value of the camera, the step comprises:
   monitoring the working state of the camera of the terminal, obtaining, by an Automatic Exposure Control (AEC) system, the illumination value of the camera; and
   looking up the second screen display brightness value according to the illumination value of the camera.

2. The method for adjusting the screen brightness of the terminal as claimed in claim 1, wherein before the step for obtaining the ambient light brightness value, and setting the first screen display brightness value corresponding to the ambient light brightness value as the screen display brightness value, the method further comprises:
   presetting a database storing corresponding relationship between the ambient light brightness value and the first screen display brightness value, and corresponding relationship between the illumination value and the second screen display brightness value.

3. The method for adjusting the screen brightness of the terminal as claimed in claim 1, wherein during the step for obtaining the ambient light brightness value, and setting the first screen display brightness value corresponding to the ambient light brightness value as the screen display brightness value, the step particularly comprises:
   determining whether the terminal is on or not, and monitoring, by an optical sensor, the ambient light brightness value at location of the terminal when the terminal is on;
   looking up the first screen display brightness value according to the ambient light brightness value; and
   adjusting the screen display brightness according to the first screen display brightness value.

4. The method for adjusting the screen brightness of the terminal as claimed in claim 3, wherein the step for looking up the first screen display brightness value according to the ambient light brightness value, the step comprises:
   providing ambient light brightness interval according to the ambient light brightness value; and
   obtaining the first screen display brightness value according to the screen display brightness value corresponding to the ambient light brightness interval;
   wherein the ambient light brightness interval is in one-to-one correspondence with screen display brightness interval.

5. The method for adjusting the screen brightness of the terminal as claimed in claim 1, wherein the step for obtaining, by the AEC system, illumination value of the camera, the step comprises:
   calculating, by the AEC system, the illumination value in real-time according to target ambiance brightness.

6. The method for adjusting the screen brightness of the terminal as claimed in claim 1, wherein before the step for looking up the second screen display brightness value according to the illumination value, the method further comprises:
   presetting corresponding relationship between the illumination value and the second screen display brightness value, and storing the corresponding relationship in a database.

7. A system for adjusting screen brightness of a terminal, comprising:
   a monitoring ambient light module obtaining ambient light brightness value and setting a first screen display brightness value corresponding to the ambient light brightness value as a screen display brightness value when the terminal is on;
   a camera exposure module monitoring a working state of a camera of the terminal, obtaining illumination value of the camera when the terminal starts the camera, and looking up a second screen display brightness value according to the illumination value of the camera; and
   an adjusting screen brightness module comparing the first screen display brightness value with the second screen display brightness value, and setting the second screen display brightness value as the screen display brightness value when the second screen display brightness value is greater than the first screen display brightness value;
   wherein the camera exposure module comprises:
   a second obtaining unit monitoring the working state of the camera of the terminal and obtaining illumination value via an Automatic Exposure Control (AEC) system of the camera when the camera starts; and
   a second look-up unit looking up the second screen display brightness value according to the illumination value.

8. The system for adjusting the screen brightness of the terminal as claimed in claim 7, further comprising:
   a monitoring state module monitoring the working state of the camera of the terminal and setting the first screen display brightness value as the screen display brightness value when the camera is off by the terminal.

9. The system for adjusting the screen brightness of the terminal as claimed in claim 7, further comprising:
   a presetting module presetting a database, corresponding relationship between the ambient light brightness value and the first screen display brightness value, and corresponding relationship between the illumination value and the second screen display brightness value are stored in the database.

10. The system for adjusting the screen brightness of the terminal as claimed in claim 7, wherein the monitoring ambient light module comprises:

a first obtaining unit determining whether the terminal is on or not, monitoring the ambient light brightness value by the optical sensor at a location of the terminal when the terminal is on;

a first look-up unit looking up the first screen display brightness value according to the ambient light brightness value; and an adjusting unit adjusting the screen display brightness according to the first screen display brightness value.

11. The system for adjusting the screen brightness of the terminal as claimed in claim 7, wherein the first look-up unit is configured to that:

ambient light brightness interval is provided according to the ambient light brightness value; and the first screen display brightness value is obtained according to the screen display brightness value corresponding to the ambient light brightness interval;

wherein the ambient light brightness interval is in one-to-one correspondence with screen display brightness interval.

12. The system for adjusting the screen brightness of the terminal as claimed in claim 7, wherein the AEC system calculates the illumination value in real-time according to target ambiance brightness.

13. The system for adjusting the screen brightness of the terminal as claimed in claim 7, wherein the camera exposure module further comprises:

a database storing corresponding relationship between the illumination value and the second screen display brightness value.

14. A terminal comprising a system for adjusting screen brightness of the terminal, wherein the system comprises:

a processor executing steps of:

obtaining ambient light brightness value and setting a first screen display brightness value corresponding to the ambient light brightness value as a screen display brightness value when the terminal is on;

monitoring a working state of a camera of the terminal, obtaining illumination value of the camera when the terminal starts the camera, and looking up a second screen display brightness value according to the illumination value of the camera; and comparing the first screen display brightness value with the second screen display brightness value, and setting the second screen display brightness value as the screen display brightness value when the second screen display brightness value is greater than the first screen display brightness value;

wherein during the step for monitoring a working state of a camera of the terminal, obtaining illumination value of the camera when the terminal starts the camera, and looking up a second screen display brightness value according to the illumination value of the camera, the step comprises:

monitoring the working state of the camera of the terminal and obtaining illumination value via an Automatic Exposure Control (AEC) system of the camera when the camera of the terminal starts; and looking up the second screen display brightness value according to the illumination value.

15. The terminal as claimed in claim 14, wherein the steps executed by the processor further comprise:

monitoring the working state of the camera of the terminal and setting the first screen display brightness value as the screen display brightness value when the camera is off by the terminal.

16. The terminal as claimed in claim 14, wherein the steps executed by the processor further comprise:

presetting a database, corresponding relationship between the ambient light brightness value and the first screen display brightness value, and corresponding relationship between the illumination value and the second screen display brightness value are stored in the database.

17. The terminal as claimed in claim 14, wherein during the step for obtaining ambient light brightness value and setting a first screen display brightness value corresponding to the ambient light brightness value as a screen display brightness value when the terminal is on, the step particularly comprises:

determining whether the terminal is on or not, monitoring the ambient light brightness value by the optical sensor at a location of the terminal when the terminal is on;

looking up the first screen display brightness value according to the ambient light brightness value; and adjusting the screen display brightness according to the first screen display brightness value.

* * * * *